(12) United States Patent
Fesbinder

(10) Patent No.: US 10,817,677 B2
(45) Date of Patent: Oct. 27, 2020

(54) SINGLE-LINE DISPLAY OF COMPOSITE-TEXT

(71) Applicant: Read TwoGether Ltd., Jerusalem (IL)

(72) Inventor: David Allen Fesbinder, Jerusalem (IL)

(73) Assignee: Read TwoGether Ltd, Jerusalem (IL)

( * ) Notice: Subject to any disclaimer, the term of this patent is extended or adjusted under 35 U.S.C. 154(b) by 0 days.

(21) Appl. No.: 16/506,135

(22) Filed: Jul. 9, 2019

(65) Prior Publication Data

US 2020/0073946 A1 Mar. 5, 2020

Related U.S. Application Data

(63) Continuation-in-part of application No. 16/114,385, filed on Aug. 28, 2018, now Pat. No. 10,346,549.

(51) Int. Cl.

| | |
|---|---|
| *G06F 17/28* | (2006.01) |
| *G06F 40/30* | (2020.01) |
| *G06F 40/58* | (2020.01) |
| *G06F 40/53* | (2020.01) |
| *G06F 40/103* | (2020.01) |
| *G06F 40/263* | (2020.01) |
| *G06F 40/284* | (2020.01) |

(52) U.S. Cl.
CPC ............ *G06F 40/58* (2020.01); *G06F 40/103* (2020.01); *G06F 40/263* (2020.01); *G06F 40/284* (2020.01); *G06F 40/53* (2020.01)

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881; G06F 40/211; G06F 40/253; G06F 40/268; G06F 40/284; G06F 40/30; G06F 40/58; G06F 40/44; G06F 40/45; G06F 40/47

USPC ........................................................ 704/2–8
See application file for complete search history.

(56) References Cited

U.S. PATENT DOCUMENTS

| | | | | |
|---|---|---|---|---|
| 4,774,666 A | | 9/1988 | Miyao et al. | |
| 5,651,107 A | * | 7/1997 | Frank .................... | G06F 3/0481 345/589 |
| 6,483,526 B1 | * | 11/2002 | Merrick ................ | G06F 3/0481 715/709 |
| 6,567,830 B1 | * | 5/2003 | Madduri ............... | G06F 40/169 715/235 |

(Continued)

FOREIGN PATENT DOCUMENTS

EP 0398477 B1 9/1996

OTHER PUBLICATIONS

Talmud Bavli Tractate Arachin, p. 19a, published by Mesorah Publications Aug. 2011.

(Continued)

*Primary Examiner* — Lamont M Spooner
(74) *Attorney, Agent, or Firm* — Aryeh Rosenzweig

(57) ABSTRACT

A rendering engine and method for a displaying a first text string and a second string of content in a single-line, composite-text string through either a framing-counter filling scheme or a counter-stroke embedding scheme, or both, so as to reduce eye fatigue and thought interruption associated with eye shift between typical display schemes in which the two text strings to be compared are presented in different fields of vision.

20 Claims, 18 Drawing Sheets

(56) References Cited

U.S. PATENT DOCUMENTS

| | | | |
|---|---|---|---|
| 6,778,950 B2* | 8/2004 | Gohari | G06F 40/45 704/2 |
| 6,901,367 B1 | 5/2005 | Berstis et al. | |
| 7,174,287 B2* | 2/2007 | Yamada | G06F 9/454 704/2 |
| 7,890,525 B2 | 2/2011 | Lu et al. | |
| 7,974,832 B2* | 7/2011 | Furuuchi | G06F 40/58 704/7 |
| 8,095,355 B2* | 1/2012 | Rosart | G06F 3/0484 704/8 |
| 8,144,990 B2* | 3/2012 | Englund | G06K 9/228 382/181 |
| 8,315,850 B2* | 11/2012 | Furuuchi | G06F 40/58 704/7 |
| D706,803 S * | 6/2014 | Rogowski | D14/486 |
| 8,761,513 B1* | 6/2014 | Rogowski | G06K 9/00 382/181 |
| 8,965,129 B2* | 2/2015 | Rogowski | G06K 9/00463 382/189 |
| 9,037,450 B2* | 5/2015 | Vukosavljevic | G06F 40/103 704/2 |
| 9,239,833 B2* | 1/2016 | Cuthbert | G06K 9/3258 |
| D749,115 S * | 2/2016 | Rogowski | D14/486 |
| 9,298,704 B2 | 3/2016 | Boyd | |
| 9,384,180 B2* | 7/2016 | Piratla | G06F 40/186 |
| 9,398,210 B2* | 7/2016 | Stach | G06T 1/0021 |
| 9,570,050 B2 | 2/2017 | Duneau | |
| 9,653,000 B2* | 5/2017 | Wee | G06F 40/58 |
| 9,690,782 B2* | 6/2017 | Vukosavljevic | G06F 40/103 |
| 9,734,132 B1* | 8/2017 | Kothandapani Shanmugasundaram | G06F 16/9577 |
| 9,773,197 B2* | 9/2017 | Englund | G06F 40/58 |
| 9,778,811 B2* | 10/2017 | Lee | G06F 40/58 |
| 9,916,305 B1* | 3/2018 | Ayan | H04L 51/063 |
| 2003/0040899 A1* | 2/2003 | Ogilvie | G06F 40/58 704/2 |
| 2003/0179110 A1 | 9/2003 | Abir | |
| 2003/0200078 A1* | 10/2003 | Luo | G06F 40/58 704/2 |
| 2008/0082317 A1* | 4/2008 | Rosart | G06F 40/58 704/8 |
| 2008/0178081 A1* | 7/2008 | Reshef | G06F 9/453 715/700 |
| 2008/0233980 A1* | 9/2008 | Englund | G06F 40/58 455/466 |
| 2009/0157381 A1* | 6/2009 | Furuuchi | G06F 40/58 704/7 |
| 2011/0090253 A1* | 4/2011 | Good | G06K 9/00671 345/633 |
| 2011/0097693 A1* | 4/2011 | Crawford | G09B 5/065 434/157 |
| 2011/0231181 A1* | 9/2011 | Furuuchi | G06F 16/986 704/7 |
| 2012/0116750 A1* | 5/2012 | Onishi | G06F 40/58 704/3 |
| 2012/0163668 A1* | 6/2012 | Englund | G06F 40/58 382/103 |
| 2012/0245922 A1 | 9/2012 | Kozlova et al. | |
| 2013/0066623 A1* | 3/2013 | Chou | H04L 67/2823 704/2 |
| 2014/0172408 A1* | 6/2014 | Vukosavljevic | G06K 9/6821 704/2 |
| 2014/0215330 A1* | 7/2014 | Lee | G09B 29/007 715/703 |
| 2015/0134318 A1* | 5/2015 | Cuthbert | G06K 9/00671 704/2 |
| 2015/0134323 A1* | 5/2015 | Cuthbert | G06K 9/00671 704/3 |
| 2015/0234812 A1* | 8/2015 | Vukosavljevic | G06K 9/00442 704/2 |
| 2017/0032554 A1* | 2/2017 | O'Donovan | G06F 3/0488 |
| 2017/0090693 A1* | 3/2017 | Ku | H04N 13/207 |
| 2017/0255614 A1* | 9/2017 | Vukosavljevic | G06K 9/6821 |
| 2019/0215416 A1* | 7/2019 | Hamaguchi | H04N 1/00384 |
| 2020/0012780 A1* | 1/2020 | Seshadri | H04L 63/08 |

OTHER PUBLICATIONS

The Metsudah Chumash, Book of Bereishis (Genesis), p. 172, published by Metsuda Publications 1993.

The Chapter of 'Manna', an Art Scroll publication 2009; Internet access at: https://artscroll.files.wordpress.com/2009/01/the-chapter-of-manna.pdf.

Cover page graphic, Book of Family Zemiros with translation and introduction, Rabbi Nosson Scherman, published by Mesorah Publications, Ltd., 1993, 1969 Coney Island Ave, Brooklyn N.Y. 11223.

* cited by examiner

FIG. 1A
(Prior Art)

At the door of the tent.¹⁰ פֶּתַח הָאֹהֶל.
To see if there are any passers by לִרְאוֹת אִם יֵשׁ עוֹבֵר וָשָׁב
that he might invite into his home.¹¹ שֶׁיַּכְנִיסֶנּוּ בְּבֵיתוֹ.

FIG. 1B
(Prior Art)

הוּא הָאֵיפָה הָעֲשִׂירִית׃ «it is.< of an ephah< —a tenth «The corner»

FIG. 1C
(Prior Art)

לא איצטריכא ליה דקא משמע לן — [This ruling] is necessary only for a place where some [merchants] weigh the pitch that they sell, while some measure their pitch by volume. קא סלקא דעתך מדה לא קא משמע לן — In such a case you might have thought that since just some, but not all [the merchants], weigh pitch, pitch

Framing Character Configurations

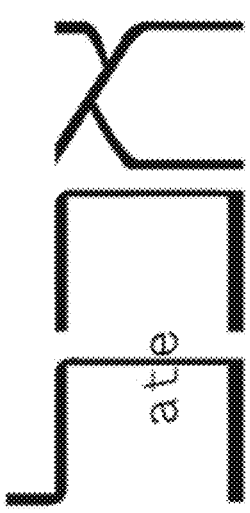 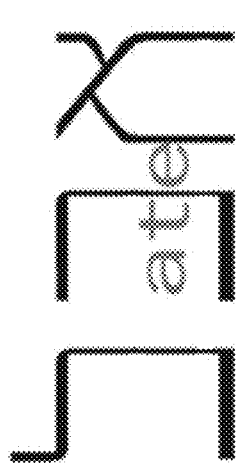 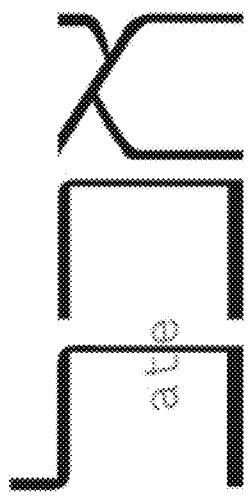
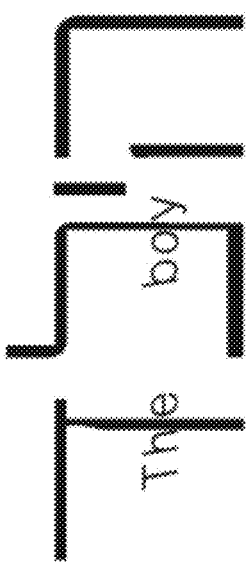 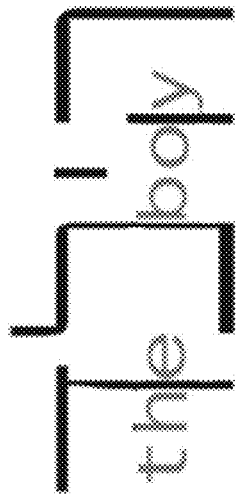 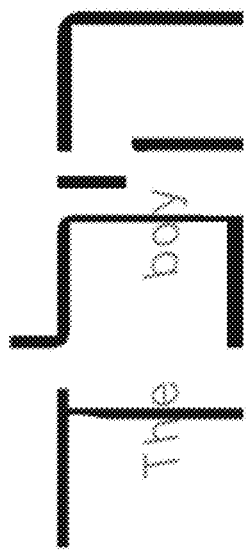
FIG. 8A     FIG. 8B     FIG. 8C Think The Rain Lakers: 130 Kings: 123

12:20 next alarm

May 9, 2019

$37.96

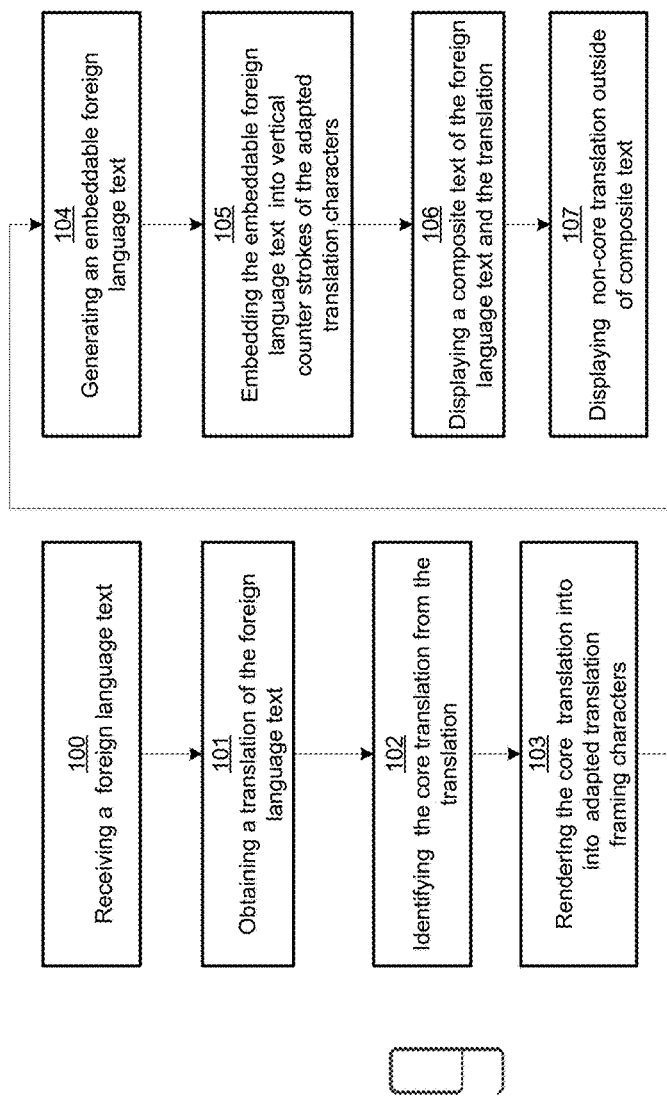
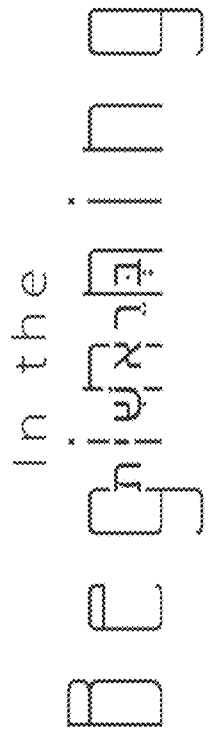
FIG. 17A
FIG. 17B

SINGLE-LINE DISPLAY OF COMPOSITE-TEXT

BACKGROUND OF THE INVENTION

The present invention relates to rendering engines operative to display two or more text strings in a single line in a manner reducing eye fatigue generated from eye shift between text strings typically displayed separately. Such examples include linear translations, advertising content, financial data, time and date displays, and teaching settings, just to name a few Therefore, there is need for a rendering engine operative to display two or more content strings in a single line while preserving readability.

SUMMARY OF THE INVENTION

According to the teachings of the present invention there is provided a method for displaying a composite text string within a single line performed on a computer having a processor, memory, and one or more code sets stored in the memory and executed in the processor, the method including: receiving a first text string of first-string, text characters; rendering a plurality of the first-string, text characters into adapted first-string text characters, each of the adapted first-string text characters having a counter characterized by a horizontal stroke disposed at a height not obscured by second-string, text characters when partially overlaying vertical counter strokes of the adapted first-string text characters; receiving a second text string of second-string, text characters; causing at least one of the second-string, text characters to appear embedded in one or more non-horizontal counter strokes of the adapted first-string, text characters; and displaying a single-line, composite text of the second-string, text characters disposed within the adapted first-string, text characters.

According to a further feature of the present invention, the adapted first-string, text characters form a contrast with a text background less pronounced than a contrast with the text background formed by the second-string, text characters.

According to a further feature of the present invention, there is also provided, filling at least one adapted first-string, character with a second-string, text character of the second text string.

According to a further feature of the present invention, the second-string, text characters set forth alphanumeric characters as set forth on a telephone keypad for a vanity number set forth in the first-string, text characters.

According to a further feature of the present invention, the second-string, text characters set forth a price of an article set forth in the first-string, text characters.

According to a further feature of the present invention, the second-string, text characters set forth a currency equivalent of a currency value set forth in the first-string, text characters.

According to a further feature of the present invention, the second-string, text characters set forth a time of a calendar date set forth in the first-string, text characters.

According to a further feature of the present invention, the second-string, text characters is implemented as a cluster segment of the first-string, text characters.

There is also provided according to the teachings of the present invention, a method for displaying a composite text string within a single line performed on a computer having a processor, memory, and one or more code sets stored in the memory and executed in the processor, the method including: receiving a first text string of first-string, text characters; obtaining a second text string of second-string, text characters; rendering a plurality of the second-string, text characters into adapted second-string text characters, each of the adapted second-string text characters having a counter characterized by a horizontal stroke disposed at a height not obscured by first-string, text characters when partially overlaying vertical counter strokes of the adapted second-string text characters; causing at least one of the first-string, text characters to appear embedded in one or more non-horizontal counter strokes of the adapted second-string, text characters; and displaying a single-line, composite text of the first-string, text characters disposed within the adapted second-string, text characters.

According to a further feature of the present invention, the adapted second-string, text characters form a contrast with a text background less pronounced than a contrast with the text background formed by the first-string, text characters.

According to a further feature of the present invention, there is also provided, filling at least one adapted second-string, character with a first-string, text character of the first text string.

According to a further feature of the present invention, the first-string, text characters set forth alphanumeric characters as set forth on a telephone keypad for a vanity number set forth in the second-string, text characters.

According to a further feature of the present invention, the first-string, text characters are implemented as a price of an article set forth in the second-string, text characters.

According to a further feature of the present invention, the first-string, text characters set forth a currency equivalent of a currency value set forth in the second-string, text characters.

According to a further feature of the present invention, the first-string, text characters is implemented as a cluster segment of the second-string, text characters.

There is also provided according to the teachings of the present invention, a rendering engine operative to composite-text in a single line, the engine including: an input device configured to capture a first text string of first-string, text characters; a processor operative to: render a plurality of the first-string, text characters into adapted first-string text characters, each of the adapted first-string text characters having a counter characterized by a horizontal stroke disposed at a height not obscured by a second-string, text character when partially overlaying a vertical counter stroke of the adapted first-string text characters, obtain a second text string of second-string, text characters, cause at least one of the second-string, text characters to appear embedded in one or more non-horizontal counter strokes of the adapted first-string, text characters; and an output device configured to display a composite text of the second-string, text characters disposed within the adapted first-string, text characters.

According to a further feature of the present invention, the processor is further configured to fill at least one adapted first-string, character with a second-string, text character of the second text string.

There is also provided according to the teachings of the present invention, a rendering engine operative to composite-text in a single line, the engine including: an input device configured to capture a first text string of first-string, text characters; a processor operative to: obtain a second text string of second-string, text characters; render a plurality of the second-string, text characters into adapted second-string text characters, each of the adapted second-string text characters having a counter characterized by a horizontal stroke disposed at a height not obscured by a first-string, text character when partially overlaying a vertical counter stroke of the adapted second-string text characters, cause at least one of the first-string, text characters to appear embedded in one or more non-horizontal counter strokes of the adapted second-string, text characters; and an output device configured to display a composite text of the first-string, text characters disposed within the adapted second-string, text characters.

According to a further feature of the present invention, the processor is further configured to fill at least one adapted second-string, character with a first-string, text character of the first text string.

BRIEF DESCRIPTION OF THE DRAWINGS

The subject matter regarded as the invention is particularly pointed out and distinctly claimed in the concluding portion of the specification. Invention components, features, their interaction, operation, and advantages are best understood with reference to the following detailed description and accompanying drawings in which:

FIGS. 1A-1C are various sample of prior art requiring constant eye shift between a foreign-language text and a translation disposed either to the side, underneath, or both;

FIGS. 8A-8C depict composite text renderings of FIG. 7B in which the center characters are displayed with color and treatment variations, according to an embodiment;

FIG. 17A depicts a composite-text, display scheme in which a foreign text is implemented as an embedded text and its core translation is displayed as a same-line, framing text while non-core translation is displayed as above-line display, according to an embodiment; and FIG. 17B depicts a flow chart of processing steps implementing the display scheme of FIG. 17A, according to an embodiment.

Figure 2:
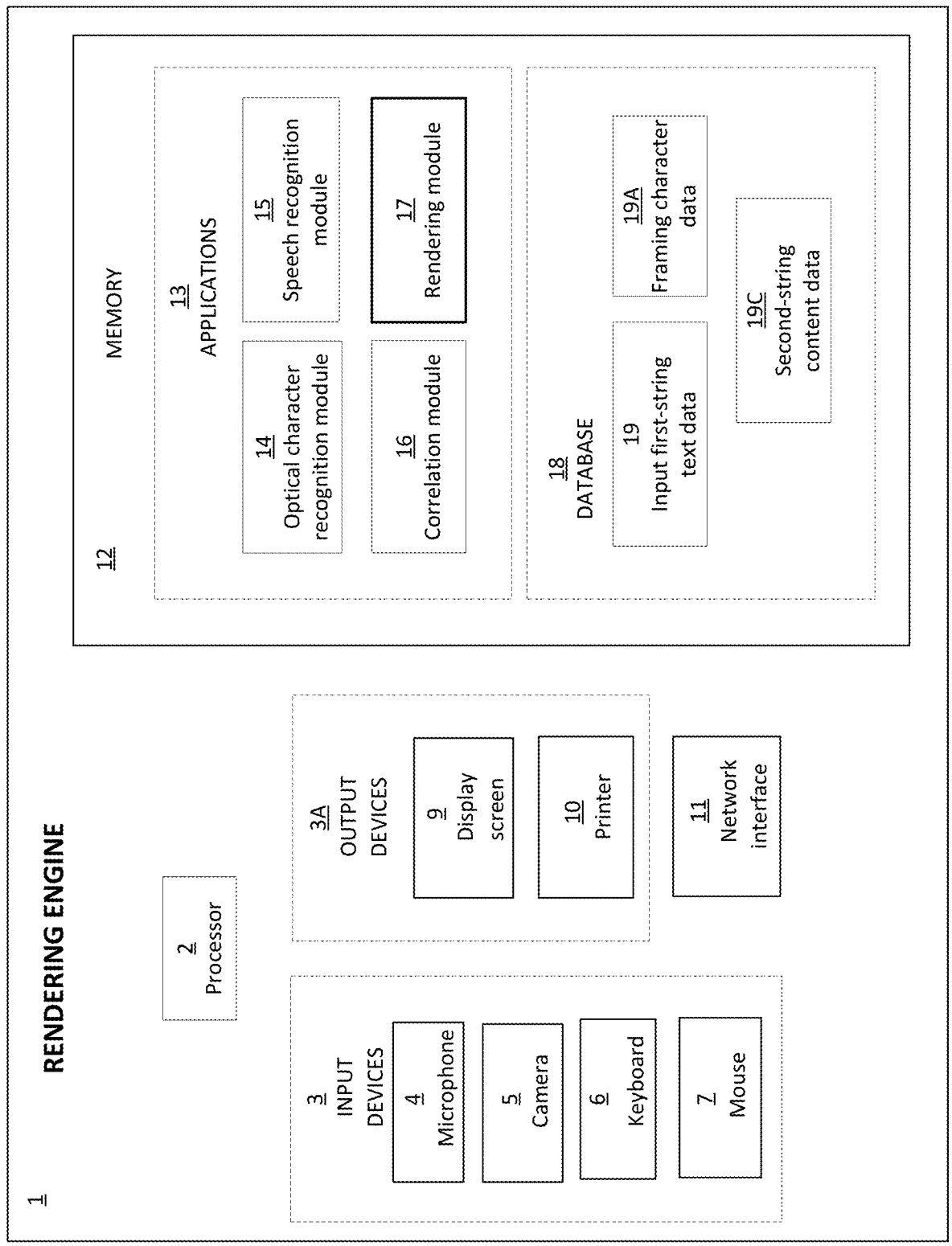
FIG. 2 is a schematic block diagram of a rendering engine, according to an embodiment.

It will be appreciated that for the sake of clarity, elements shown in the figures are not necessarily drawn to scale and reference numerals may be repeated among figures to indicate corresponding or analogous elements.

DETAILED DESCRIPTION OF THE PRESENT INVENTION

The following description sets forth various details to provide a thorough understanding of the invention and it should be appreciated, by those skilled in the art, that the present invention may be practiced without these specific details. Furthermore, well-known methods, procedures, and components have been omitted to highlight the present invention.

As noted, the current invention is a rendering engine directed to displaying a two separate content strings in a single text line in a manner complying with readability and legibility requirements.

Following are terms to be used throughout this document:

"Input text" or "input language" refers to a text string input to the system. Text includes numbers, letters, symbols, and acronyms in accordance with language conventions.

"English is considered the translation language for the purposes of this document. It should be appreciated that a language is deemed be a foreign-text entirely on the basis of user preference and the present rendering engine provides user configurability to enable users to define the language to be treated as a foreign language and the language to be treated as a translation language.

"Typeface and "character" refer to the actual letter body.

A "font" is a typeface rendered in a treatment, weight, and size. For example, a "Times New Roman typeface rendered with italic treatment, bold weight, and 12 pt size is a Times New Roman, italic bold 12 pt" font. In addition to these font parameters, the font also includes a side bearing around the typeface set by the font designer. Font data includes this data for these parameters and spacing parameters.

"Framing character" refers to a character enclosing region of sufficient area to contain one or more receiving regions. Enclosing two or more complete sides is deemed to be enclosing.

"Counter" refers to an area enclosed on at least two sides by a framing character with area of sufficient size to enclose one or more receiving regions.

In a certain embodiment, the counter of each framing character is implemented with the same width. In another embodiment, the counter width of framing characters is word specific and can vary on a word by word basis.

"Center text" or "center characters" refers to characters disposed within receiving regions; either inside framing-character counters, in-between framing characters, or both inside and in-between framing characters simultaneously. Center characters shifted vertically or horizontally from the center of a receiving region are still deemed to be a center characters if minimally enclosed by a framing character.

"Framing character spacing" refers to intra-word spacing between framing characters, in a certain embodiment. It is defined by one or more widths of the receiving regions in accordance with configuration preferences. For example, the spacing between framing letters is configurable as one, two, or three receiving regions. In another embodiment, intra-word spacing is defined by unfilled receiving regions within counters of framing characters contacting each other.

Inter-word spacing of framing characters between words is greater than the intra-word spacing of framing characters, in accordance with configuration preferences. It should be noted that these are minimum inter-word spacing of framing characters. In certain situations when the number of center characters exceeds the number of receiving regions available within a framing word, the spacing between framing words will be increased by the number of receiving regions necessary to receive the center characters.

"Center character spacing" refers to the spacing between center characters within words and is defined by side bearings built into the font file of the center character by font designers, in a certain embodiment. The juxtaposition of side bearings of adjacent center characters provides natural spacing by aligning the advance width of the center characters with the points of division defining receiving region boundaries, as will be further discussed. In a certain embodiment, negative side bearings are employed to define spacing between center characters when the center characters are implemented as script.

In a certain embodiment, the center characters are glyph justified to achieve alignment of the advance width of center characters with demarcation points dividing a display space into receiving regions.

In a certain embodiment, the center characters are implemented with kerning-modified side bearings define center character spacing within cell boundaries.

It should be noted that although all embodiments depict display schemes employing horizontal counter-filling or counter stroke embedding, in a certain embodiment vertical counter filling or counter stroke embedding are employed.

Turning now to the figures, FIGS. 1A-1C depict various types of prior art directed at providing a translation to a foreign-language text. As shown, in FIG. 1A the translation is presented as a separate text line disposed to the side of the foreign-language text whereas in FIG. 1B the translation is disposed underneath the foreign text, and in FIG. 1C the translation is presented both to the side and underneath of the foreign-language text. As previously noted, all of these display configurations whether displayed as virtual text on a display screen or as printed text all fatigue the reader because of required eye shift.

FIG. 2 is schematic block diagram of rendering engine 1 configured to display two or more text strings as a composite text in a single line. It should be noted that for the purposes of this document a series of pictures is deemed to be a content string.

In a certain embodiment, the rendering engine 1 includes at least one processor 2 and input devices 3 including a microphone 4 for speech capture, a camera 5 for visual text capture, a keyboard 6, and a mouse 7. Output devices 3A include a display screen 9 in any of the various forms associated with computing devices, and a printer 10. Engine 1 also includes a network interface 11 for network enablement. It should be appreciated that processing may be implemented either locally or remotely via various forms of wireless or wired networking technologies or a combination of both.

Memory 12 includes various types of short and long-term memory as is known in the art. Memory 12 is loaded with various applications or algorithms including optical character recognition module 14 for rendering captured text images into text, a speech recognition module 15 for rendering recorded speech into foreign-language text, a correlation module 16 for accessing various types of content strings in accordance with the particular application, and a text rendering module 17 for displaying a composite text in a single text string as will be further discussed. Memory 12 also includes a database 18 of input first-string text data 19 and second-string content data 19C. Second-string content may be linked to input data as a semantic linkage, currency equivalence, pricing, advertising material, writing style, telephone numbers, dates, time, and pictorial content, for example. Framing character data 19A of adapted framing characters having required counter geometries enabling composite-text display.

Engine 1 is operative to employ various font technologies like raster, vector, TrueType, and Microsoft OpenType and database 18 also includes associated font-resource files.

It should be appreciated that in a certain embodiment, translation module 16 is configurable to translate various foreign languages into either English or other chosen languages. Accordingly, database 18 includes all necessary content and in a certain embodiment is implemented locally whereas in another embodiment it is implemented remotely. It should be appreciated that pre-translated content is also stored with translation data and is employed when processing text in which pre-translated content is available, according to an embodiment.

FIGS. 3A-3D depict various, sample framing characters having a standardized typeface geometry forming a counter width equal to an integer multiple of receiving region widths, with an area within the counter devoid of a traversing stroke so as to enable and having height sufficient to receive receipt of ascenders or descenders of center characters within the receiving regions without contacting the framing characters, in a certain embodiment. It should be noted that the reference grid highlights a series of mono space demarcations in a display space defining placement of receiving regions and is shown as grid to highlight the basis of a spacing scheme; the grid is absent when the composite-text is displayed.

Figure 3A:
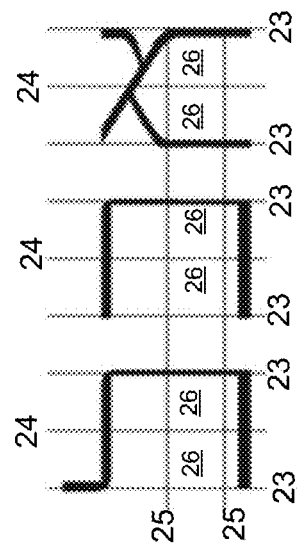
FIGS. 3A-3D are various samples of framing characters depicted in reference grids highlighting receiving regions disposed within counters of the framing characters, according to an embodiment.

Specifically, FIG. 3A depicts sample English framing characters in a reference grid highlighting two receiving regions 22 within the counter of each of the English framing characters. As shown, each of the two receiving regions 22 between reference lines 20 and counter median 21 have widths that are fractions of the counter width highlighted by reference lines 20. It should be appreciated that, generally, the cumulative width of receiving regions is substantially equal to the width of the counters of the framing characters.

Figure 3B:
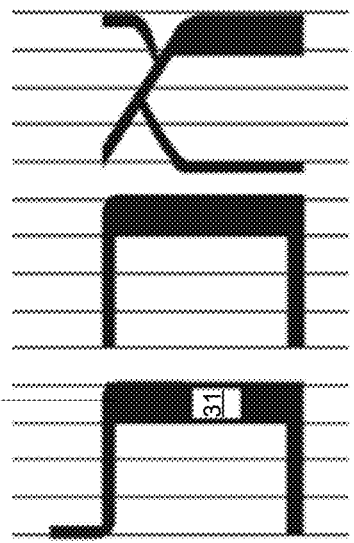

FIG. 3B depicts sample Hebrew framing characters in a reference grid highlighting two receiving regions 26 within each of the Hebrew framing characters. Here too, each of the two receiving regions 26, between reference lines 23 and counter median 24 have a width which is fraction of the counter width. Horizontal reference lines 25 depict a necessary geometry requirement of the framing character to provide sufficient height in the receiving region to receive a center character in the absence of contact between an ascender or descender with the framing letter.

Figure 3C:
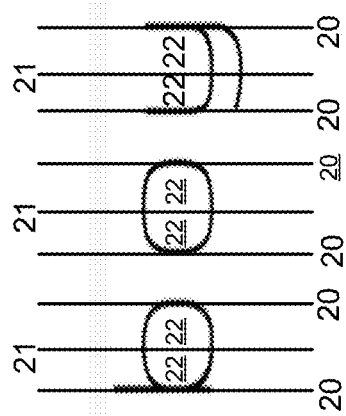

FIG. 3C depicts sample Hebrew framing characters in a reference grid analogous to the sample depicted in FIG. 3B. As shown, four receiving regions 26 collectively span the counter width highlighted by reference lines 27. Two of the four receiving regions 27 are disposed on each side of counter median 28. In this manner center characters populating receiving regions 27 are offset from the middle of counter of the framing counter. Here too, horizontal reference lines 29 depict a necessary geometry requirement of the framing character to provide sufficient height in the receiving region to receive a center character in the absence of contact between an ascender or descender with the framing letter.

Figure 3D:
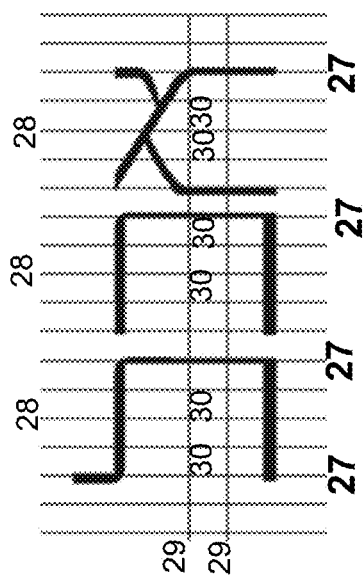

FIG. 3D depicts Hebrew framing characters in a reference grid analogous to the sample depicted in FIG. 3C in which a vertical stroke 30 of the framing has a width substantially equal to the width of any of the three receiving regions whose collective widths span the counter. Vertical stroke 30 includes a window 31 for receipt of a center character to be read together with center characters disposed in other receiving regions. As shown, a portion of the framing letter overlaps side bearings of the center character as will be further discussed.

It should be appreciated that the width of the receiving region also defines the spacing between the framing characters, in a certain embodiment. Alignment between framing and center characters is achieved through the depicted virtual grid highlighting demarcations defining positioning of the receiving regions and framing characters, according to an embodiment. Furthermore, in a certain embodiment, the width of the receiving regions is set by a user or font designer. In another embodiment, the width of the receiving regions is configurable as a fraction of the width of a given framing-character counter. Additionally, it should be appreciated that in a certain embodiment the framing characters are implemented with broken or dashed lines.

Figure 4A:
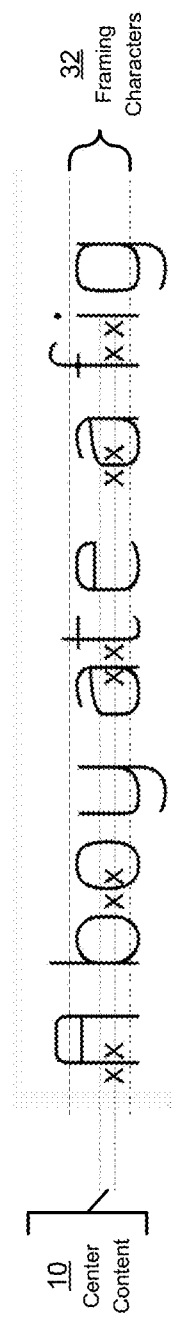
FIGS. 4A-4B depict various, horizontal placement options of center content within English translation-framing characters, according to an embodiment.
Figure 4B:
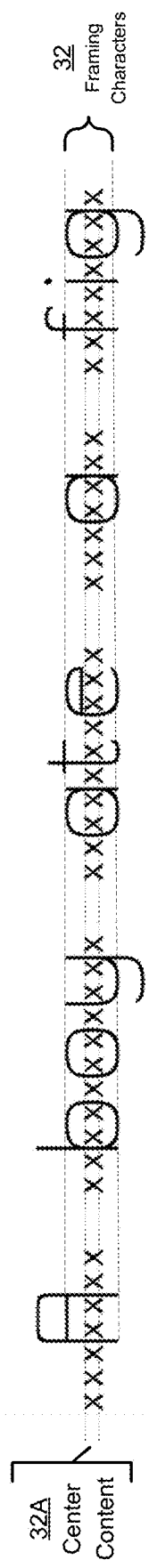

FIGS. 4A-4B depict a framing text of English language, Latin framing characters 32 in which a few of the available receiving regions have been populated with center content 32A. Center content 32A is depicted in general terms to highlight the fact that it can be implemented in various foreign languages to the word or the phrase within which it is framed, in accordance with the embodiment. In a certain embodiment, center content 32A is implemented as a translation of the word or phrase associated with the framing characters 32. In another embodiment, center content 32A is implemented as an ideograph or pictogram. In another embodiment, center content 32A is implemented as a picture, whereas in another embodiment it is implemented as an instruction or commentary. In another embodiment, a combination of these content types is employed as a content type mix. This document is directed to the translation of a foreign language text.

As shown in FIG. 4A, some of the receiving regions bound by an element of the framing character are filled and other receiving regions are unfilled. This illustrates a certain configuration employing a fill order in which the receiving regions bound by a framing character are filled prior to other receiving regions.

Figure 6:
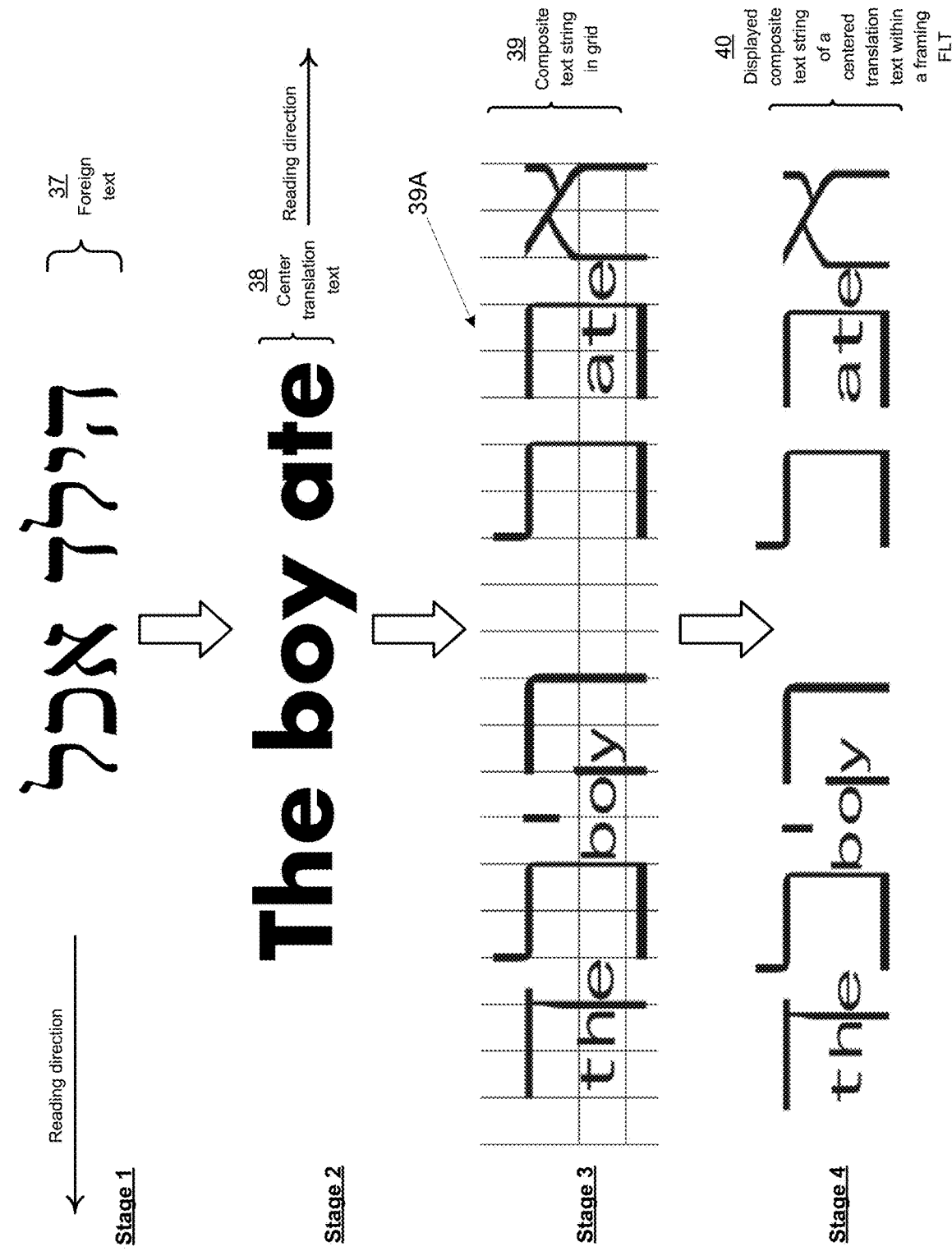
FIG. 6 depicts rendering stages of a sample English translation characters disposed in associated Hebrew framing characters into a composite text string, according to an embodiment.

Accordingly, when the framing character is English, read from left to right, the fill order first populates the receiving regions bound by the left element of the framing character as shown in charters "A", "o" and "a". When the framing characters are Hebrew, read from right to left, the receiving regions bound by the right side of the Hebrew framing letter are filled first, as shown in FIG. 6, stage 3, in the word furthermost to the right.

In terms of word placement of the center text within the framing characters, in a default configuration the fill order is operative to center the embedded text in the middle of the framing word as shown in the word "boy", in a certain embodiment. It should be noted, that the horizontal centering of words formed from centering characters within the associated framing words is a configurable feature, in a certain embodiment.

FIG. 4B depicts a composite-text display in which the center content exceeds the length of the associated word expressed in the framing characters. In such instances, rendering engine 1 is configured to provide as many additional, empty receiving regions between framing words to ensure that translation content is placed within the appropriate framing word or phrase, according to an embodiment.

In another embodiment, engine 1 is configured to reduce the width of the receiving regions responsively to threshold deviation between the number of receiving regions required to contain all center characters associated with the framing characters. This configuration advantageously reduces the number of center characters between words formed by framing characters.

Figure 4C:
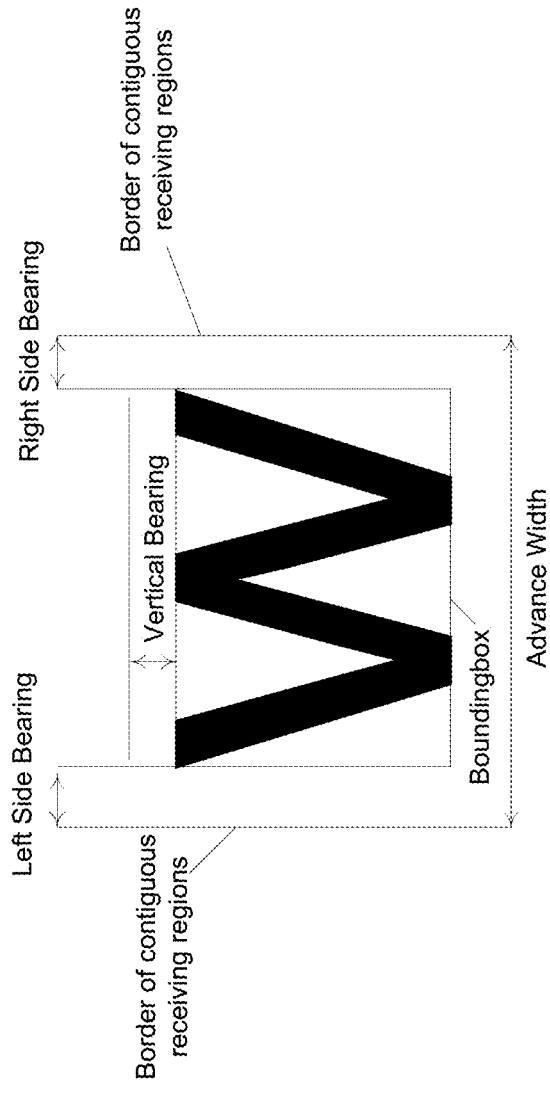
FIG. 4C depicts a center character and its side bearings between the character and the boundaries of the receiving region within which the character is disposed; according to an embodiment. Accordingly, adjacent side bearings of contiguous receiving regions define spacing between center characters. It should be appreciated that the cumulative space of the two side bearings is reduced by overlay of a framing character disposed in between the two receiving regions as will be further discussed.

FIG. 4C depicts a typeface and its associated side bearings and cumulative advance width of the side bearings and typeface. As shown, the side bearings are measured from the outer extremities of the typeface as highlighted with the boundingbox. The side bearings embody the ideal spacing between characters providing legibility in which the characters are minimally spaced to facilitate discerning of each separate character and readability in which the characters don't exceed a maximin spacing to facilitate mental association between characters. These minimum and maximum spacing thresholds between center characters are set by the font designer. The instant rendering engine advantageously leverages the side bearing by filling the entire width of a receiving region with the advance width of a center character so that adjacent side bearings set center-character spacing for a legible and readable center text within the framing text, according to an embodiment.

It should be noted that in certain fonts, like scripts for example, the character spacing is set by a negative side bearing as is known to those skilled in the art. That means that the spacing between center characters is not measured from the outermost extremity of the center character; but rather, from the inner boundary of the negative side bearing.

It should be appreciated that in certain embodiment a portion of a side bearing bordering a framing character can be partially overlaid by a portion of a framing character.

Figure 5:
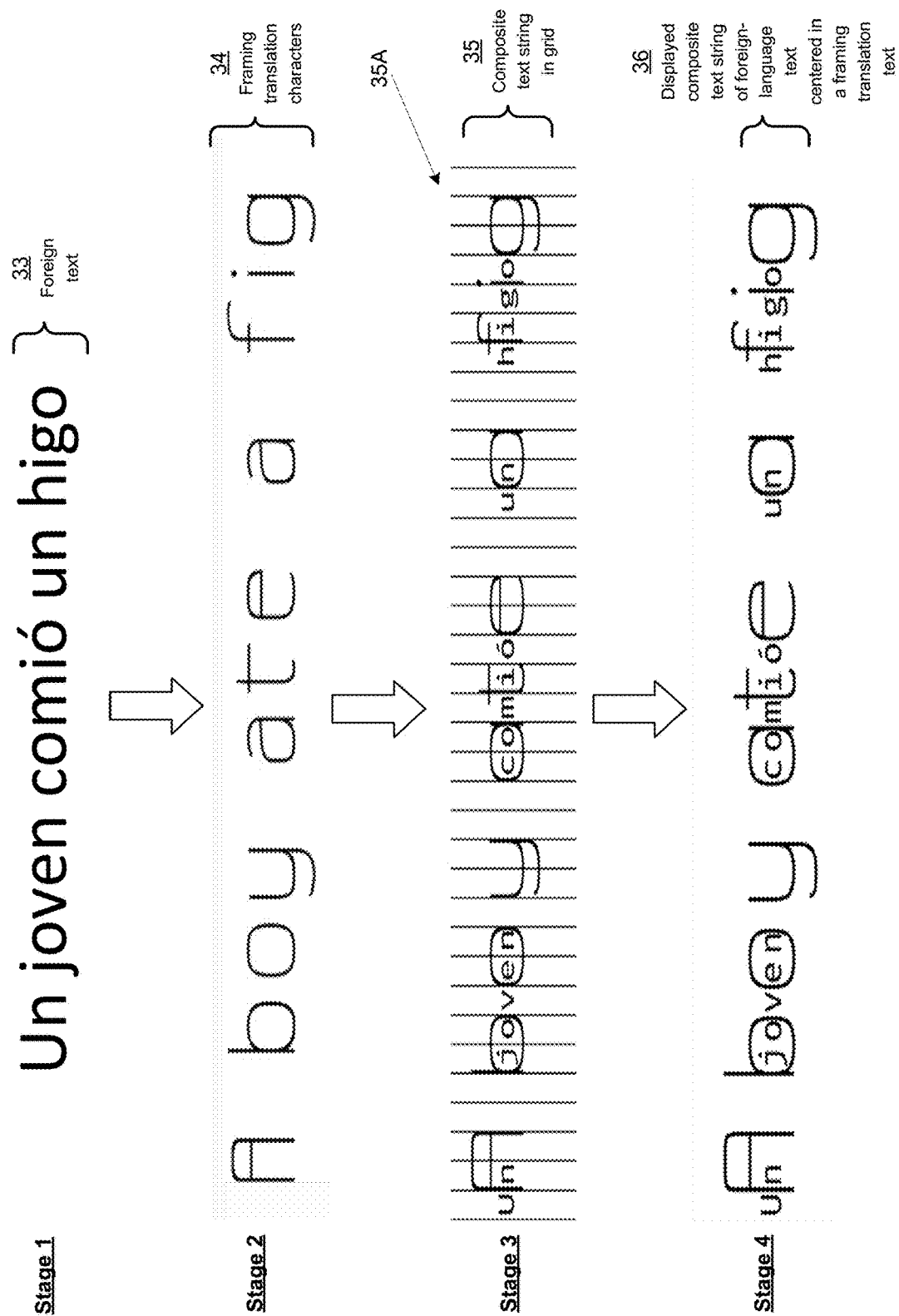
FIG. 5 depicts various rendering stages of a sample Spanish foreign-language text and English framing characters into a composite text string, according to an embodiment.

FIG. 5 is a depiction of rendering stages involved in the display of a foreign-language text and its translation into a single composite text, according to an embodiment.

Specifically, in this example, Stage 1 depicts Spanish text 33 received by rendering engine 1 (Shown in FIG. 2) and stage 2 depicts English translation 34 is identified. In this configuration, Spanish characters 33 are treated as center characters and English characters as framing characters. Stage 3 depicts Spanish characters 34 populating the appropriate translation framing letters 34 associated with the English translation in accordance with demarcated receiving regions highlighted here with reference grid 35A. Stage 4 depicts, the display of a grid-free, composite text string of the Spanish text enclosed by its English translation as a readable foreign text and translation that can be read in the absence of tiring eye shift associated with typical translations offset from their foreign-language text.

FIG. 6 is also a depiction of rendering stages involved in the display of a foreign-language text and its translation into a single composite text. In the depicted example, Hebrew foreign-language text 37 is treated as the framing text and English translation text is treated as the center text. It should be noted that engine 1 is operative to handle languages read in opposite directions as depicted in this example Specifically, in this example, stage 1 depicts a sample Hebrew text 37 received by rendering engine 1 (Shown in FIG. 2.) and stage 2 depicts an English translation 38 identified. Stage 3 depicts Hebrew characters 37 populated with the appropriate English translation characters 38 in accordance with demarcated receiving regions highlighted here with the reference grid 39A. Stage 4 depicts a grid-free composite text string 40 of Hebrew text enclosing English translation characters 38 at a character spacing in approximation with readability standards for both the framing and center text strings to greatly reduce, if not to entirely eliminate, tiring eye shift associated with typical translations offset from the foreign text.

The noted standardized geometry of the framing characters together with the standardized receiving regions advantageously enable an interchangeability of characters of various writing systems while preserving legibility and readability requirements.

It should be appreciated that in any alphabet there are framing characters like "t", "f", and "i" may not be conducive to sufficiently enclosing a region to form counter, in accordance with typographer design. Such letters are deemed to be counter-free framing characters and adjacent, receiving regions are populated in accordance with translation needs. Framing characters possessing a typeface geometry enclosing two or more complete sides of a receiving region are deemed to have a counter, according to an embodiment. Broken or dashed strokes are treated as solid strokes for the purposes of this document.

Figure 7A:
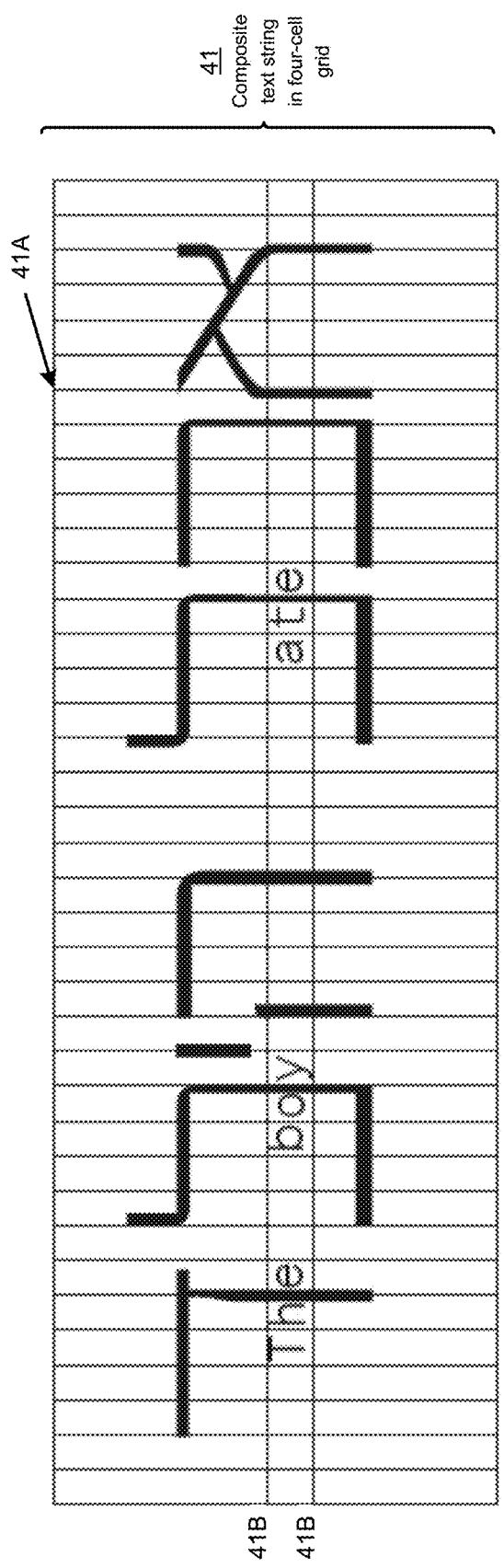
FIGS. 7A-7B depict an alternative, configuration option of FIG. 5 in which counters of the Hebrew framing characters are partitioned into four receiving regions, shown within a reference grid and in the absence of the reference grid, respectively, according to an embodiment.
Figure 7B:
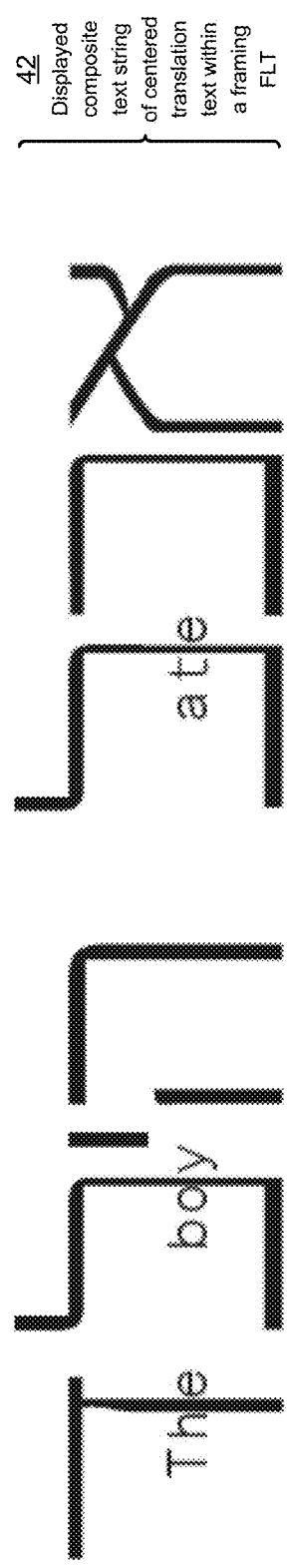

FIGS. 7A-7B depict an alternative configuration of that depicted in FIG. 6 with the reference grid and the final display form without the grid, respectively Specifically, the counter width of the Hebrew framing characters has been divided into four receiving regions as depicted by reference grid 41A. As noted above, the number of receiving regions for a counter of a framing character is an integral multiple equal to or greater than, one. Horizontal markers 41B depict the required height of the receiving regions that must be accommodated by the framing characters to avoid intersect between ascenders and descenders of center characters with the framing characters, according to an embodiment. In another embodiment, center and framing characters contact each other without overlapping.

FIGS. 8A-8C depict variant configurations of that depicted in FIG. 6 in which the center characters are implemented with various, user-selected font parameters.

Specifically, FIG. 8A depicts center characters implemented with an italicized treatment, FIG. 8B depicts center characters implemented with a color differing from that of the framing characters, and FIG. 8C depicts center characters implemented with both italicized treatment and a variant color. It should be appreciated that a wide variety of color, weights, treatments, sizes, and their combination are user-configurable. Analogously, user configuration capabilities also exist for framing characters, according to an embodiment.

It should be appreciated that in a certain embodiment center and framing characters are slanted in their reading direction when they have opposite reading directions. In another variant embodiment, both center and framing characters are slanted in the same direction.

Figures 9A, 9B:
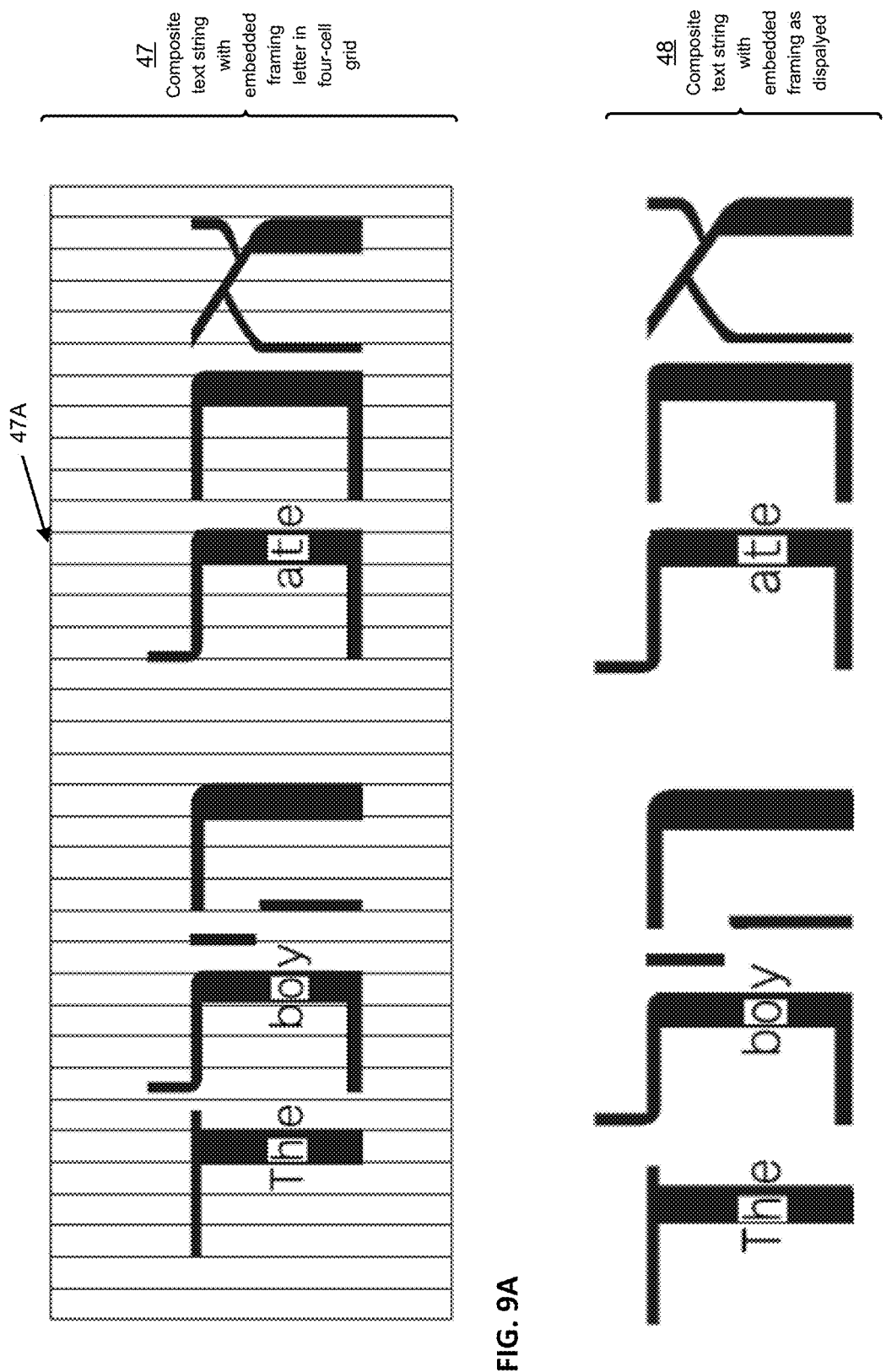
FIGS. 9A-9B depict gridded and non-gridded stages, respectively, of an alternative embodiment of the composite text of FIG. 8B in which center characters are disposed in the body of framing characters, according to an embodiment.

FIGS. 9A-9B depict a variant configuration of that depicted in FIGS. 8A-8B. As shown in FIG. 9A, the framing counter contains three receiving regions, as highlighted with reference grid 47A, within framing characters having a widened vertical stoke equal in width to a receiving region width. A receiving window is disposed within each of the widened vertical strokes for receipt of a center character while all other framing-character geometry requirements are preserved. A portion of the framing character overlays the side bearings of the center characters whose advance width, spanning the stroke width, is effectively diminished by the partial overlay of the framing character. In another configuration, the advance width spans the entirety of the vertical stroke with no framing character overlap of the side bearings and it should be appreciated that the degree of overlay of the side bearings defines the degree of empty space visible within the vertical stroke.

FIG. 9B depicts the final, grid-free display version of FIG. 9A.

Figures 9C, 9D, 9E, 9F, 9G, 9H:
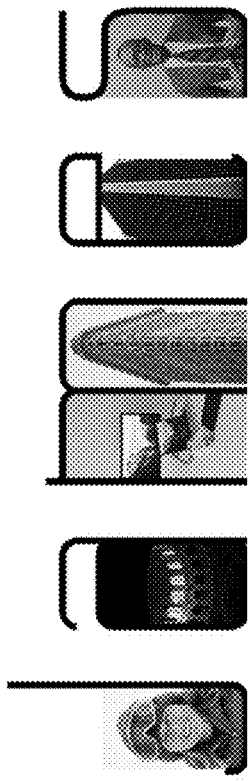
FIG. 9C depicts a composite-text, display scheme employing proportional font embedded within Hebrew framing characters, according to a variant embodiment.
FIG. 9D depicts a composite-text, display scheme employing broken-lined framing characters, according to a variant embodiment.
FIG. 9E depicts a composite-text, display scheme for an advertisement and scoreboard, according to an embodiment.
FIG. 9F depicts a display scheme employing pictorial content embedded within framing letters, according to an embodiment.
FIG. 9G depicts composite-text, display schemes for date, time, and alarm, according to variant embodiments.
FIG. 9H depicts a composite-text, display scheme for an advertisement of article for purchase and its price, according to an embodiment.

FIG. 9C depicts a composite-text display scheme in which the center characters are implemented as proportional fonts. For the sake of highlighting the variable spacing between characters associated with proportion fonts, a reference grid is depicted. It should be appreciated that all embodiments depicted employing a counter filling scheme are implemented with either monofont or proportional font characters in accordance with the embodiment.

FIG. 9D depicts a variant embodiment in which the adapted framing characters are implemented with line breaks. As noted above the space is treated as a single stroke. It should be appreciated that all embodiments depicted may be implemented with either broken, dashed or solid strokes in accordance with the embodiment.

FIG. 9E depicts a composite-text, display scheme in which the scoring of a sporting event is disposed in the counter of framing characters spelling the name of a sponsor, according to an embodiment. As shown, the framing letters may be implemented one color, such as, for example light gray, while the center characters may be implemented in another color, such as, for example, black. Such color schemes generate one level of contrast between the center character and the background and lesser level of contrast between lighter framing colors depict and the background. This reduced contrast advantageously minimizes mental distraction while viewing the scoring while still providing sufficient visibility when the viewer refocus attention to the framing content. It should be appreciated that this color scheme is applied to other applications set forth in this document in accordance with application requirements. It should be appreciated by those skilled in the art that other color schemes may be used.

FIG. 9F depicts a display scheme in which the second-string content centered within framing characters is set forth as pictorial content, according to an embodiment. It should be appreciated that in certain embodiment the number of pictures centered within a word formed by framing characters is set in accordance with user configuration. Furthermore, in a certain embodiment the pictorial content is be linked to the content set forth by the framing characters.

FIG. 9G, depicts a composite-text, display scheme for date and time in which a date is embedded inside counters of adapted framing characters to advantageously enable one to observe both the time and date and/or alarm in a single glance. It should be appreciated that the composite-text is deemed to be single line as long as all content is disposed within the framing characters.

FIG. 9H depicts a composite-text, display scheme for an advertisement of article for purchase and its price, according to an embodiment.

Figure 10A:
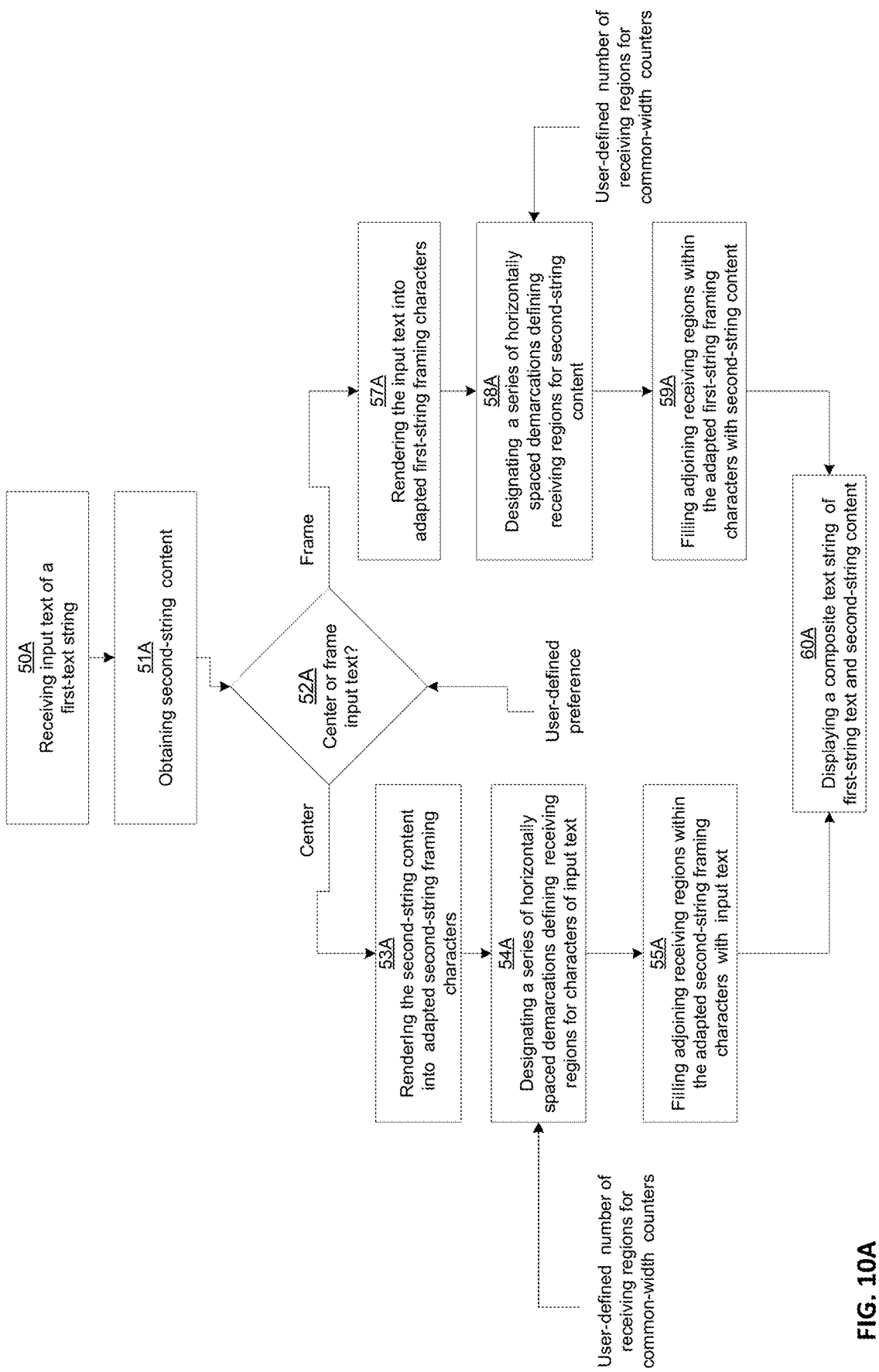
FIG. 10A is a flowchart depicting process steps of the rendering engine of FIG. 2 implementing a counter-filling display scheme for a composite-text in which monfont characters fill framing character counters, according to an embodiment.

FIG. 10A depicts a flow chart of steps employed to generate a composite-text, display scheme based on counter-filling of monofont receiving regions in view of rendering engine 1 of FIG. 2.

As shown in step 50A, an input text of a first string of text (also referred to as a first-string text) is received either directly through keyboard 6 from speech recognition module 15 after conversion of speech captured through microphone 4, or from optical character recognition module 14 after conversion from an image captured by camera 5, in accordance with embodiment. In a certain embodiment a user-configured combination of text input methods is employed.

In step 51A, a second-string of content (also referred to as second-string content) that may be related to the first-string text is obtained through correlation module 16. As noted above, correlation module 16 is configurable to generate a correlated or related content to the input text in real time or utilize an existing correlation in second-string content data 19C.

In step 52A, a configuration option is implemented on the basis of user preference setting forth the input text of the first-string text as either a center text or as a framing text.

When the input text is implemented as center characters, processing continues to step 53A where the obtained second-string text is rendered into adapted second-string framing characters and stored as framing character data 19A of database 18. As noted above, framing characters have standardized geometries defining counters with sufficient width and height to accommodate center characters without obscuring framing characters. In a certain embodiment the noted rendering is matter of replacing the obtained second-string text characters with pre-designed adapted characters.

It should be appreciated that in a variant embodiment, framing character adaptation is achieved through a variable font operative to change the horizontal width of the counter in accordance with counter filling requirements of display schemes employing counter filling.

In step 54A, a series of horizontally spaced demarcations of a display space are designated. These demarcations define placement of receiving regions that can potentially receive input text.

In a certain embodiment, the width of the center characters is pre-defined by a user and the framing characters are designed to enclose a desired number of center characters such that the counter width of the framing character is substantially equal to the cumulative width of the receiving regions.

In an alternative embodiment, the framing characters are pre-designed and the number of receiving regions to be enclosed by framing character counters is selected by a user in accordance with the actual or maximum number of center characters desirable to be displayed within a counter.

In a certain embodiment the width of the receiving region also defines spacing between framing characters and also spacing between framing words as multiples of the receiving region widths. In another embodiment, unfilled receiving regions enclosed by framing character counters provide spacing between center characters. It should be appreciated that in a certain embodiment, counter widths may vary for different words formed by framing characters whereas in another embodiment, the width of framing counters is substantially identical across all words formed by framing characters.

In step 55A, the identified receiving regions are filled with input text characters. In a certain configuration, glyph justification is employed. In a certain configuration kerning is applied in accordance with spacing restrictions set by the receiving region boundaries. It should be appreciated that upon filling the designated receiving regions, the input text character is disposed either within an adapted framing character, or in-between a framing character, or both inside and in-between framing characters. In this regard, the terms "within" refers to both enclosed, sandwiched, or both enclosed and sandwiched.

In step 60A, a composite-text string of the input text framed inside correlated or related framing characters is output either on display screen 9, printer 10, or both.

When the input text is implemented as framing characters, processing continues to step 57A where the input text is rendered into adapted first-string framing characters stored in framing character data 19A of database 18. As noted above, framing characters have geometries defining common-width counters with sufficient width and height to receive center characters without being obscured by them. In a certain embodiment the noted rendering is a matter of replacing input text characters with pre-designed adapted characters, as noted above.

Processing steps 57A-60A directed to centering second-string content within adapted first-string framing characters text are analogous to steps 53A-60A directed to centering first-string content input text within adapted second-string framing characters and should be understood accordingly.

It is noted that in step 59A, the identified receiving regions are filled with second-string framing characters in accordance with a fill order priority such that the centered content is both enclosed and sandwiched between framing characters. In certain embodiments, both enclosure and sandwiching is achieved on the same center characters. Furthermore, it should be appreciated that the term filling, in all instances of this document, refers to placing a character into a receiving region regardless of the extent of the width of the center content.

Figure 10B:
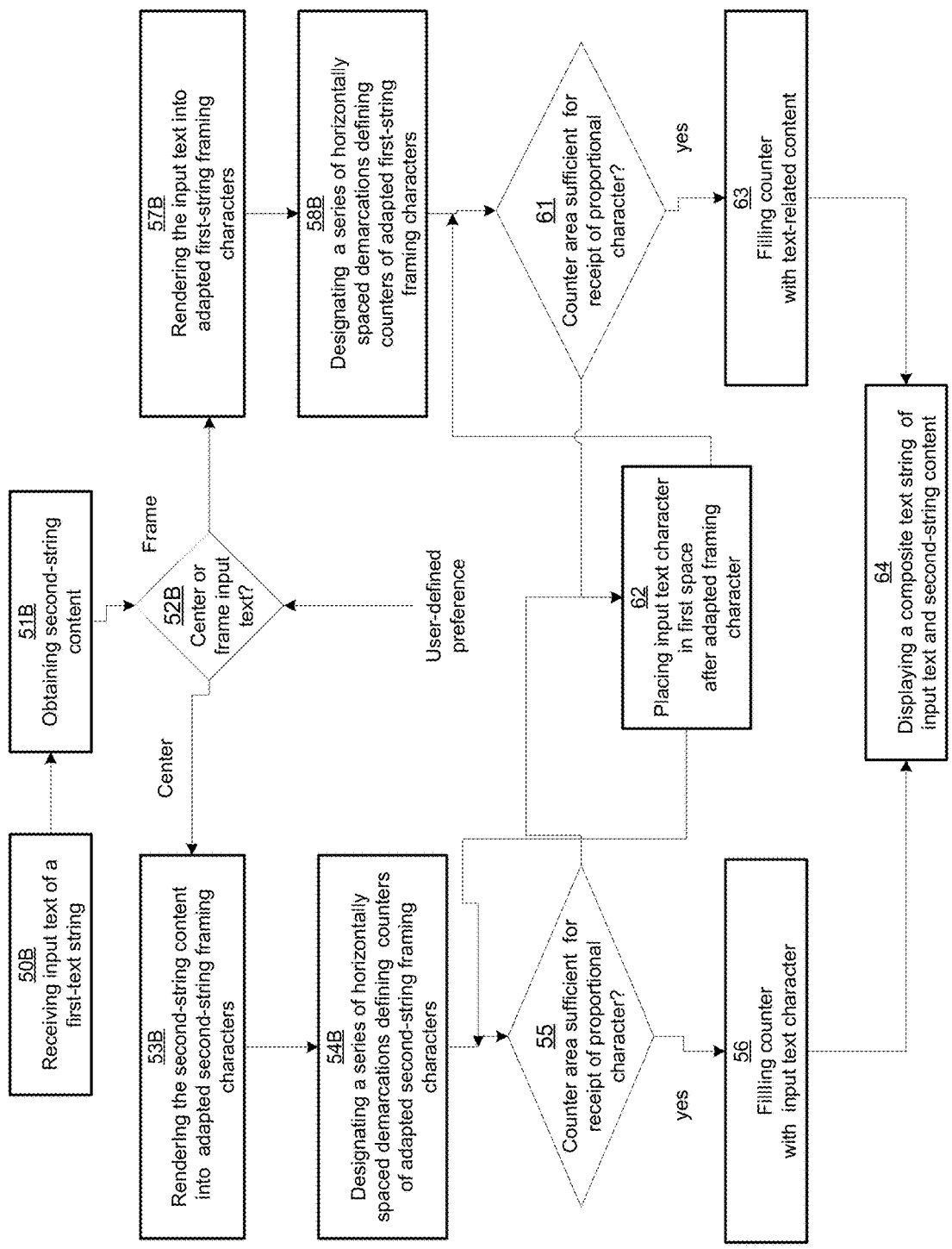
FIG. 10B is a flowchart depicting process steps of the rendering engine of FIG. 2 implementing a counter-filling display scheme for a composite-text in which proportional characters fill framing character counters, according to a variant embodiment.

FIG. 10B is a flow chart depicting process steps of the rendering engine of FIG. 2 implementing a counter-filling, display scheme for a composite-text in which proportional characters are disposed within adapted framing character counters, according to a variant embodiment.

Specifically, in step 50B an input text of a first-text string (also referred to as a first-string text) is received and in step 51B second-text string content is obtained from database 19C or other sources. In step 52B a decision is made on the basis of user preferences whether the input text is to be displayed in the form of adapted framing characters or as proportional font centered within adapted framing characters.

In analogous steps 53B and 57B the relevant content (either first- or second-string content) is rendered into either adapted first-string framing characters or adapted second-string characters by replacing the characters with adapted framing characters found in database 19A.

In analogous steps 54B and 58B, a series of horizontally spaced demarcations defining counter boundaries of the adapted framing characters is designated.

In analogous steps 55 and 61 a check is performed to evaluate if there exists sufficient space within the designated counter width to receive a proportional character without intersecting the framing counter boundaries If found that there exists sufficient space, then processing proceeds to either of analogous steps 55 and 61 in which the proportional center character is disposed within the appropriate adapted framing character.

If the answer to the query of analogous steps 55 and 61 is negative, then the proportional character is not placed within the adapted framing character and in step 62 the character is placed in the next available space following the skipped framing character.

In step 64, the resulting composite-text is displayed as either centered proportional content within either adapted first-string adapted characters or adapted second-string adapted characters according to a variant embodiment.

Figure 11B:
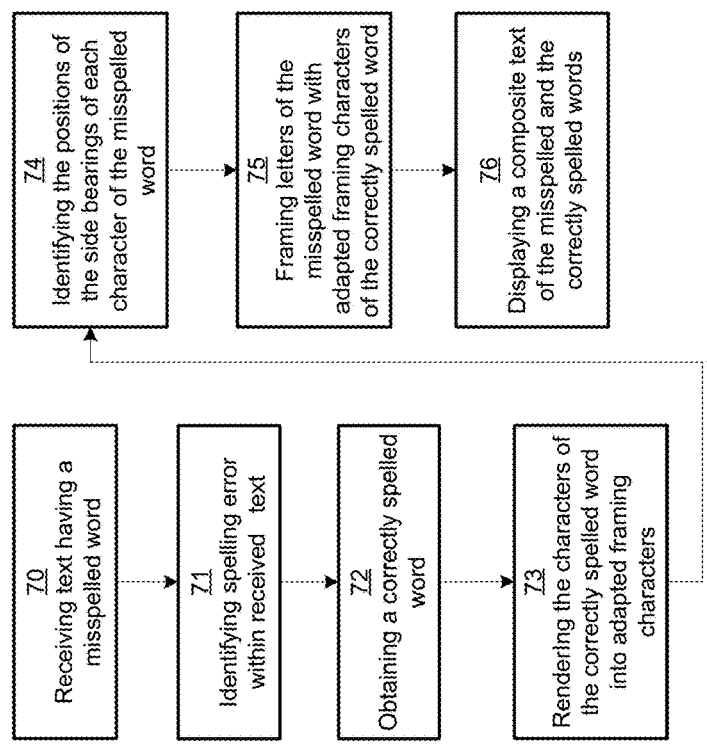
FIG. 11B depicts a flow chart of processing steps implementing the display scheme of the spell checker of FIG. 11A, according to an embodiment.
Figure 11A:
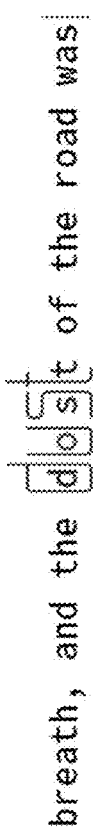
FIG. 11A depicts a composite-text, display scheme for spell checker in which characters of a misspelled word are framed by characters of the correctly spelled version, according to an embodiment.

FIG. 11A depicts a composite-text, display scheme for a spell checker in which adapted characters of a correctly spelled word frame characters of a misspelled word to adventurously provide a reader with local single line comparison of the erroneous spelling together with the corrected version to advantageously facilitate memorization of the proper spelling. As shown, the erroneous letter or letters may also be displayed in a different color, like red for example, to highlight the error. The framing is operative to frame one or more erroneous characters together with proper characters in a certain embodiment whereas in another variant embodiment only the erroneous characters are framed. In a certain embodiment, the correct letter is colored to highlight the proper spelling to facilitate memorization of the correct spelling in either the same color the erroneous letter is highlighted or in another color in accordance with configuration guidelines.

FIG. 11B is a schematic flow chart depicting process steps for implementing the spell-checker display scheme of FIG. 11A.

Specifically, in step 70 text having a spelling error is received and in step 71 the error is identified by way of known spelling checking technologies. In step 72 a correctly spelled word or various possibilities are obtained from a database. In step 73 characters of the various options or chosen option are rendered into adapted framing characters. In step 74 one or more letters erroneous letters are framed by the adapted framing characters of the correctly spelled word. In a certain configuration, correctly spelled letters also frame correctly spelled letters of the misspelled word as depicted in FIG. 11A. In step 75, a composite text of the misspelled word together with the corrective framing text is displayed in a single line.

Figures 12A, 12B:
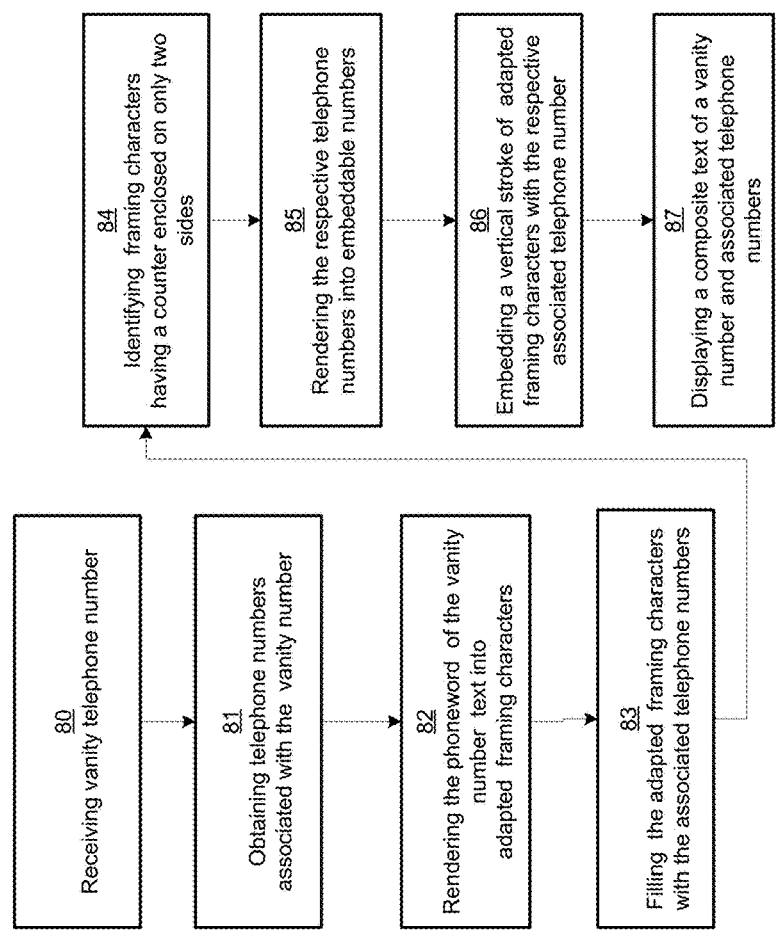
FIG. 12A depicts a composite-text, display scheme of a vanity telephone number in, according to a variant embodiment.
FIG. 12B depicts a flow chart of processing steps implementing the display scheme of the vanity telephone number of FIG. 12A, according to an embodiment.

FIG. 12A depicts a composite-text, display scheme for a vanity telephone number and the associated telephone numbers to advantageously provide a reader with a single line display of a phoneword and the telephone numbers forming it.

FIG. 12B is a schematic flow chart depicting process steps implementing the composite-text, display scheme of FIG. 12A.

Specifically, in step 80 a vanity telephone number is received and in step 81 the associated telephone number is obtained from a database containing the alphanumeric associations found on a telephone keypad. In step 82, the letters of phoneword component of the vanity number are rendered into adapted framing characters. In step 83 the adapted framing characters are filled with the respective number. In step 84 adapted framing characters having a counter enclosed on only two sides is identified. In step 85, the respective number associated with the adapted framing characters having a counter enclosed on only two sides is processed into an embeddable form as will be described. In step 86, the embeddable number is embedded in the vertical stroke of the adapted framing characters having a counter enclosed on only two sides. In step 87, a composite text of the phoneword and the associated telephone numbers is displayed in a single line.

It should be appreciated that the described processing is directed to situations in which the vanity number is configured to be the input text. However, it should be noted that analogous processing is executed when the associate telephone numbers are rendered into adapted framing characters and phoneword component is centered or embedded into the framing characters.

Figures 13A, 13B, 14:
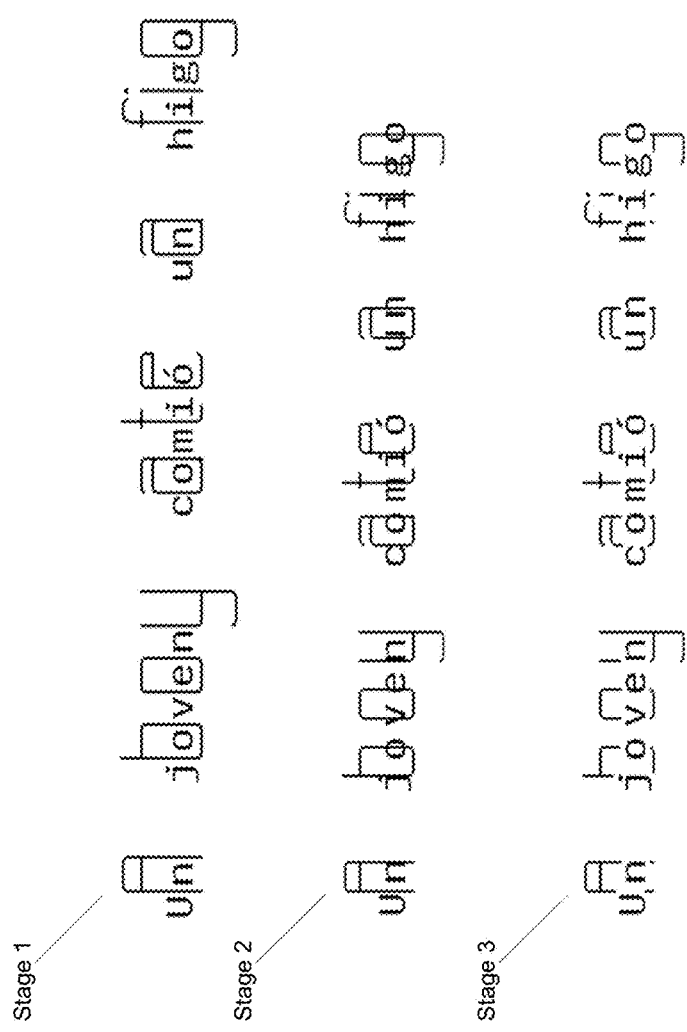
FIG. 13A depicts a composite-text, display scheme for cursive and printing styles, according to an embodiment.
FIG. 13B depicts a composite-text, display scheme for currency exchange rates, according to an embodiment.
FIG. 14 depicts a variable composite-text display scheme in which an counter-filling scheme automatically changes to a stroke-embedding scheme responsively to excessive overlap between the two texts, according to an embodiment.

FIG. 13A depicts a composite-text, display scheme for cursive and printing styles in which the printing style characters are embedded within the cursive style characters to advantageously facilitate learning of cursive, according to an embodiment. In a variant embodiment the cursive style is embedded inside the printing style.

FIG. 13B depicts a composite-text, display scheme for currency exchange rates that advantageously enable one to perceive in a single glance the relevant rates without visually tracing relevant rates as is common when disposed at a distance from each other. This is one sample of many possibilities in which two numbers in any financial analysis can be more easily read since one can view both numbers at one time instead of comparing figures commonly present in separate columns or rows.

In addition to reducing eye movement and fatigue associated with intensive financial analysis, this financial display scheme facilitates mistake reduction emanating from incorrect comparison of financial data by presenting relevant data in a single field of vision.

FIG. 14 depicts steps of an automatic display scheme in which a counter-filling display scheme is automatically replaced with a stroke-embedding scheme responsively to excessive overlap between center and framing characters, according to an embodiment.

As shown, in stage 1, related text is center characters are disposed inside counters of adapted framing characters. In stage 2, the framing characters are reduced in size while the center characters remain the same size by a user providing such configuration parameters. This size reduction creates an untenable situation in which both the center and framing characters are obscured thereby degrading legibility of the composite text.

Rendering engine 1 is configured to change the display scheme from the counter-filling scheme of stage 1 to the stroke-embedding scheme of stage 3 responsively to achievement of a threshold degree of interference. A sample threshold is contact between the center and framing letters in four locations within a single word, for example. Such thresholds are configurable.

Figure 15:
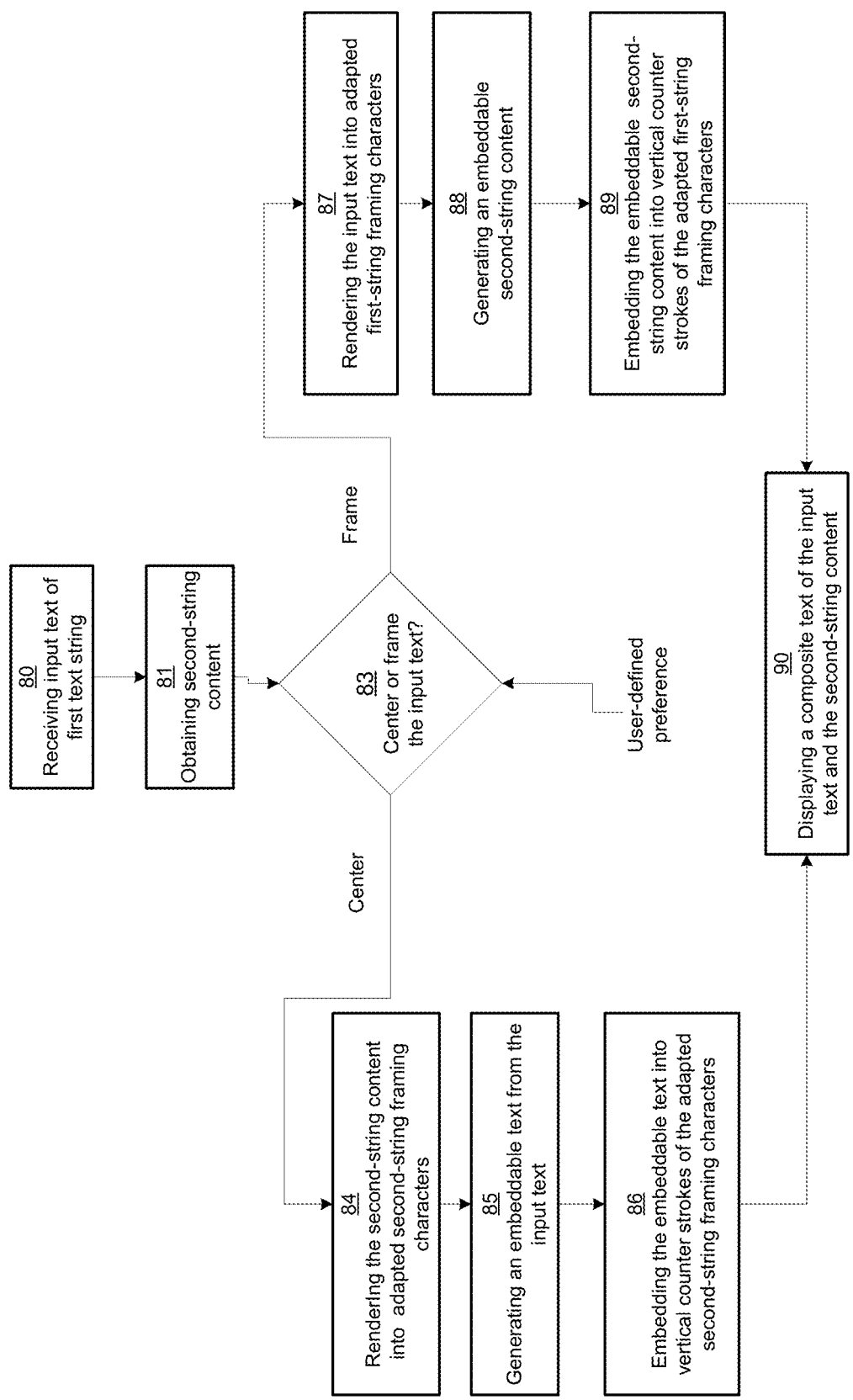
FIG. 15 is a flow chart depicting process steps of the rendering engine of FIG. 2 implementing a stroke embedding display-scheme for a composite text in which characters are embedded within vertical strokes of framing character, according to an embodiment.

FIG. 15 is a schematic flow chart depicting process steps for a stroke embedding display scheme to generate a single-line composite text.

In step 80, an input text of a first text string (also referred to as a first-sting text) is received. In step 81, a second-string content is received that may be related to the first string. If related, a user may define the nature of the relationship or correlation. In a certain embodiment the engine identifies the type of correlation between the two strings. In step 83, a processing decision is made whether to process the first string as a content to be centered with framing characters of whether it should be treated as framing characters themselves.

Both options involve analogous steps as described in the context of FIGS. 10A and 10B. Specifically, analogous steps 84 and 87 text characters are rendered into either adapted first-string or second-string framing characters characterized by counters of sufficient height to receive embedded characters within the vertical strokes without obscuring horizontally traversing strokes. As shown, the adapted framing characters have counters of sufficient height to ensure character legibility by providing sufficient height to avoid obscuring substantially horizontally traversing strokes when the related text characters are embedded into the framing character strokes, as noted above.

In analogous steps 85 and 88, the appropriate characters are rendered into embeddable characters by overlaying each character onto an enlarged copy functioning as a background matching the color of the general background. The collective unit of the character overlaying its enlarged duplicate forms an embeddable character appearing to be embedded when disposed on framing letter strokes. In another variant embodiment, the embeddable characters are formed by populating a background-colored strip overlaying text characters to also create an impression that the characters are embed within framing letter strokes.

In analogous steps 86 and 89, the embeddable characters overlay non-horizontal counter strokes of the adapted framing characters to create the effect of being embedded into the counter strokes without obscuring horizontally traversing strokes, as noted above. It should be noted that in a certain embodiment the adapted counter receives the overlay.

In step 90, the resulting single-line composite text is displayed in any of a variety of output devices as noted above.

It should be appreciated that the above-noted construction methods of embeddable characters are also employed in other display schemes in which the embedded characters are embedded into character strokes of adapted framing characters.

Figure 16C:
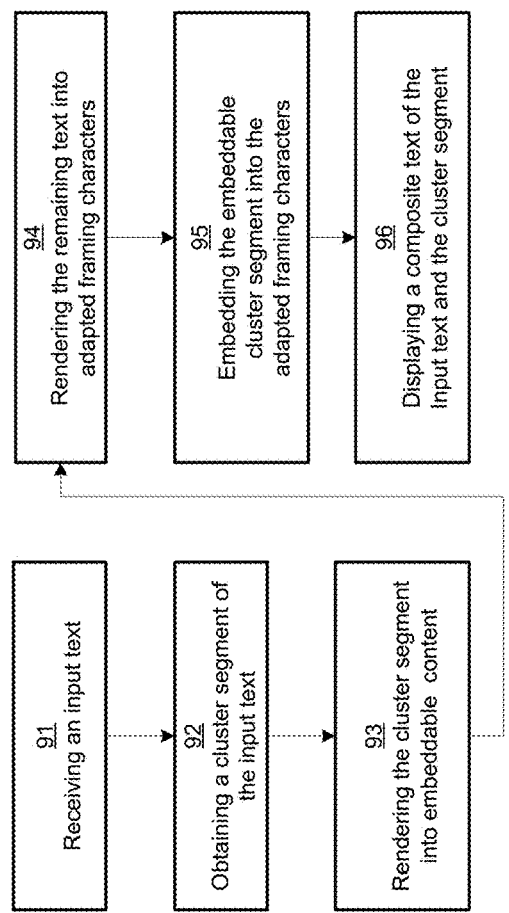
FIG. 16C depicts a flowchart of processing steps implementing the display scheme of the cluster sentence of FIG. 16A.
Figure 16A:
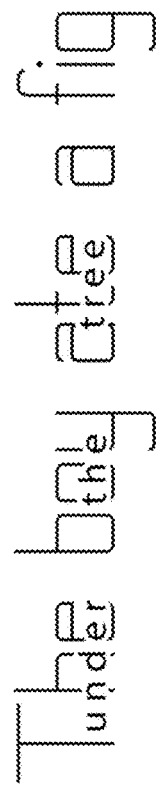
FIG. 16A depicts a composite-text, display scheme for a cluster sentence employing adapted framing characters, according to an embodiment.

FIG. 16A depicts a display scheme for a sentence a cluster segment displayed as a single-line composite text.

Figure 16B:
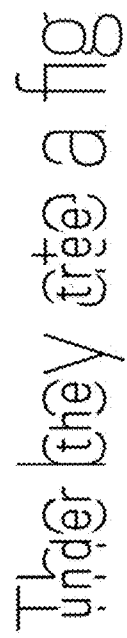
FIG. 16B depicts the composite-text, display scheme of FIG. 16A with non-adapted framing characters.

FIG. 16B depicts the cluster sentence of FIG. 16A with non-adapted framing characters and highlights the loss of character legibility from obscurity of the horizontally-traversing, strokes. Visibility of crossbar strokes contributes significantly to character legibility and compensates for loss of clarity resulting from partial obscurity of non-vertical strokes. It should be appreciated that crossbar strokes having a curvature are also deemed to be horizontally-traversing.

It should be appreciated that this legibility preservation scheme applies to all embodiments employing stroke embedding.

FIG. 16C depicts a flow chart of processing steps employed in the composite-text, display scheme for the cluster sentence of FIG. 16A.

Specifically, in step 91 an input text is received and then in step 92 a cluster segment of the text is obtained from a database.

In step 93, the obtained cluster segment is rendered into embeddable content in accordance with either one of the above-described processes.

In step 94, the portion of the text that is not the cluster segment is rendered into adapted framing characters. In step 95, the embeddable cluster segment is embedded into the vertical counter strokes of the adapted framing characters, and in step 96 a composite text of the input text content and the cluster segment is displayed as described above.

It should be noted that processing steps set forth in processing steps of FIG. 15 in a certain embodiment may be implemented with the analogous steps set forth in counter filling embodiments set forth in FIGS. 10A and 10B.

FIG. 17A depicts a display scheme for a composite-text of a foreign language text is disposed within a core translation of the foreign language text and a non-core translation is displayed outside of the composite text, according to an embodiment.

Core translation are translation components that are primary parts of speech like a noun, a verb, or both together; whereas other parts of speech are deemed to be non-core translations. The particular parameter is configurable and may be set by interested parties such as users or manufactures, for example.

FIG. 17B depicts a flow chart of processing steps employed to achieve the display scheme of FIG. 17A, according to an embodiment.

Specifically, in step 100 an input text in the form of a foreign language is received and in step 101 a translation is obtained. In step 102, a core translation is identified in accordance with the configuration guidelines noted above. In step 103, the core translation is rendered into adapted framing characters. In step 104 the translation text is rendered into an embeddable translation text. In step 105, the embeddable foreign language text is overlain non-horizontal counter strokes of the adapted core translation framing characters to create an effect of being embedded into the count relevant counter strokes. In step 106, a comprise text of foreign language content and core translation are displayed in a single line and the non-core translation is displayed either above, below, to the side, or a combination of these positions in accordance with the variant embodiment.

It should be noted that processing steps set forth in processing steps of FIG. 15, in a certain embodiment these steps are implemented with the analogous steps set forth in counter filling embodiments set forth in FIGS. 10A and 10B.

It should be appreciated that the center and framing characters are displayed in accordance with the above-noted user selected font parameters, like color, treatment, font size.

Furthermore, in a certain embodiment employing a display screen, the translation characters are displayed momentarily or for a user-defined time-period like 2 seconds, 5 seconds, 10 seconds, 30 seconds, or even 60 seconds. In another embodiment, the translation characters are displayed responsively to user input. In this embodiment also, the display time is configurable. Analogously, in another embodiment, the translation characters are displayed automatically until receipt of a user input terminating their display.

User input is implemented either though a touch screen or through verbal instruction. In a certain embodiment, the engine tracks user usage and builds a user profile of viewing time, string correlations of interest, for example, and other parameters that can provide user interests and usage that is also leveraged by the engine to automatically provide user-specific functionality.

As noted, the composite text string advantageously reduces eye fatigue thought interruption by displaying two different types of content strings within a field of vision single defined by single-line display thereby enabling near simultaneous viewing with a minimum amount of eye shift. Single-line display spans the area bound by the vertical extremities of the framing characters, in a certain embodiment.

This rendering engine embodies a significant advance over existing rendering engines that lack the ability to display single-line composite texts in a manner devoid of clutter and character overlap that is also compliant with accepted legibility and readability norms.

It should be appreciated that combination of features disclosed in different embodiments are also included within the scope of the present inventions.

It should be noted that although various embodiments presented here are covered in the issued claims of the parent application, they are presented here in conjunction with a counter stroke embedding, display scheme.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for displaying a composite text string within a single line performed on a computer having a processor, memory, and one or more code sets stored in the memory and executed in the processor, the method comprising:
   receiving a first text string of first-string, text characters;
   rendering a plurality of the first-string, text characters into adapted first-string text characters, each of the adapted first-string text characters having a counter characterized by a horizontal stroke disposed at a height not obscured by second-string, text characters when partially overlaying vertical counter strokes of the adapted first-string text characters;
   receiving a second text string of second-string, text characters;
   causing at least one of the second-string, text characters to appear embedded in one or more non-horizontal counter strokes of the adapted first-string, text characters; and
   displaying a single-line, composite text of the second-string, text characters disposed within the adapted first-string, text characters.

2. The method of claim 1, wherein the adapted first-string, text characters form a contrast with a text background less pronounced than a contrast with the text background formed by the second-string, text characters.

3. The method of claim 1, further comprising filling at least one adapted first-string, character with a second-string, text character of the second text string.

4. The method of claim 3, wherein the second-string, text characters set forth alphanumeric characters as set forth on a telephone keypad for a vanity number set forth in the first-string, text characters.

5. The method of claim 3, wherein the second-string, text characters set forth a price of an article set forth in the first-string, text characters.

6. The method of claim 3, wherein the second-string, text characters set forth a currency equivalent of a currency value set forth in the first-string, text characters.

7. The method of claim 3, wherein the second-string, text characters set forth a time of a calendar date set forth in the first-string, text characters.

8. The method of claim 1, wherein the second-string, text characters is implemented as a cluster segment of the first-string, text characters.

9. A method for displaying a composite text string within a single line performed on a computer having a processor, memory, and one or more code sets stored in the memory and executed in the processor, the method comprising:
   receiving a first text string of first-string, text characters;
   obtaining a second text string of second-string, text characters;
   rendering a plurality of the second-string, text characters into adapted second-string text characters, each of the adapted second-string text characters having a counter characterized by a horizontal stroke disposed at a height not obscured by first-string, text characters when partially overlaying vertical counter strokes of the adapted second-string text characters;
   causing at least one of the first-string, text characters to appear embedded in one or more non-horizontal counter strokes of the adapted second-string, text characters; and
   displaying a single-line, composite text of the first-string, text characters disposed within the adapted second-string, text characters.

10. The method of claim 9, wherein the adapted second-string, text characters form a contrast with a text background less pronounced than a contrast with the text background formed by the first-string, text characters.

11. The method of claim 9, further comprising filling at least one adapted second-string, character with a first-string, text character of the first text string.

12. The method of claim 11, wherein the first-string, text characters set forth alphanumeric characters as set forth on a telephone keypad for a vanity number set forth in the second-string, text characters.

13. The method of claim 11, wherein the first-string, text characters are implemented as a price of an article set forth in the second-string, text characters.

14. The method of claim 11, wherein the first-string, text characters set forth a currency equivalent of a currency value set forth in the second-string, text characters.

15. The method of claim 11, wherein the first-string, text characters is implemented as a cluster segment of the second-string, text characters.

16. A rendering engine operative to composite-text in a single line, the engine comprising:
   an input device configured to capture a first text string of first-string, text characters;
   a processor operative to:
      render a plurality of the first-string, text characters into adapted first-string text characters, each of the adapted first-string text characters having a counter characterized by a horizontal stroke disposed at a height not obscured by a second-string, text character when partially overlaying a vertical counter stroke of the adapted first-string text characters,
      obtain a second text string of second-string, text characters,
      cause at least one of the second-string, text characters to appear embedded in one or more non-horizontal counter strokes of the adapted first-string, text characters; and
   an output device configured to display a composite text of the second-string, text characters disposed within the adapted first-string, text characters.

17. The engine of claim 16, wherein the processor is further configured to fill at least one adapted first-string, character with a second-string, text character of the second text string.

18. A rendering engine operative to composite-text in a single line, the engine comprising:
   an input device configured to capture a first text string of first-string, text characters;
   a processor operative to:
      obtain a second text string of second-string, text characters;
      render a plurality of the second-string, text characters into adapted second-string text characters, each of the adapted second-string text characters having a counter characterized by a horizontal stroke disposed at a height not obscured by a first-string, text character when partially overlaying a vertical counter stroke of the adapted second-string text characters,
      cause at least one of the first-string, text characters to appear embedded in one or more non-horizontal counter strokes of the adapted second-string, text characters; and
   an output device configured to display a composite text of the first-string, text characters disposed within the adapted second-string, text characters.

19. The engine of claim 18, wherein the processor is further configured to fill at least one adapted second-string, character with a first-string, text character of the first text string.

20. The engine of claim 19, wherein the adapted second-string, text characters form a contrast with a text background less pronounced than a contrast with the text background formed by the first-string, text characters.

* * * * *